(12) United States Patent
Miyazawa

(10) Patent No.: US 6,791,608 B1
(45) Date of Patent: Sep. 14, 2004

(54) DIGITAL CAMERA AND DIRT POSITION DETECTING METHOD FOR DIGITAL CAMERA

(75) Inventor: Azuma Miyazawa, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/507,980

(22) Filed: Feb. 22, 2000

(30) Foreign Application Priority Data

Feb. 24, 1999 (JP) .......................... 11-046437
Feb. 16, 2000 (JP) ..................... 2000-038526

(51) Int. Cl.⁷ .............................................. H04N 9/64
(52) U.S. Cl. ................... 348/246; 348/251; 348/333.04
(58) Field of Search ........................... 348/333.04, 241, 348/251, 187, 246, 247, 248; 250/208.1

(56) References Cited

U.S. PATENT DOCUMENTS

| | | | | |
|---|---|---|---|---|
| 4,893,185 A | * | 1/1990 | Fukushima et al. | 348/247 |
| 5,436,979 A | * | 7/1995 | Gray et al. | 382/141 |
| 5,589,882 A | * | 12/1996 | Shiraishi et al. | 348/340 |
| 5,805,216 A | * | 9/1998 | Tabei et al. | 348/246 |
| 6,035,072 A | * | 3/2000 | Read | 382/275 |
| 6,233,364 B1 | * | 5/2001 | Krainiouk et al. | 382/275 |
| 6,396,539 B1 | * | 5/2002 | Heller et al. | 348/246 |

FOREIGN PATENT DOCUMENTS

| | | | |
|---|---|---|---|
| JP | 07-021306 | * | 2/1995 |
| JP | 10-322603 | * | 12/1998 |
| JP | 2000-599690 | * | 2/2000 |

\* cited by examiner

Primary Examiner—Ngoc-Yen Vu
Assistant Examiner—Chriss S. Yoder, III
(74) Attorney, Agent, or Firm—Frishauf, Holtz, Goodman & Chick, P.C.

(57) ABSTRACT

A digital camera whose lens is detachable, comprising a judging section for judging whether an image failure is caused due to dirt adhering on an image sensor device unit including image sensor device, an illuminating member which is disposed in the vicinity of the image sensor device unit such that irradiation light can enter the image sensor device and which is driven when at least the judgment is made, a memory for storing a position of a picture element of the image sensor device corresponding to image sensor data causing image failure when the judging section judged that image failure has been caused, and a correcting section for correcting the image sensor data output from the image sensor device unit based on picture element position data stored in the memory when a picture is photographed after the lens is interchanged.

22 Claims, 5 Drawing Sheets

DIGITAL CAMERA AND DIRT POSITION DETECTING METHOD FOR DIGITAL CAMERA

CROSS-REFERENCE TO RELATED APPLICATIONS

This application is based upon and claims the benefit of priority from the prior Japanese Patent Applications No. 11-046437, filed Feb. 24, 1999; and No. 2000-038526, filed Feb. 16, 2000, the entire contents of which are incorporated herein by reference.

BACKGROUND OF THE INVENTION

The present invention relates to a digital camera to which a lens can be attached and to a dirt position detecting method for the digital camera.

A digital camera which photographs an image by a solid-state image sensor device such as a CCD and stores the obtained image data in a storage medium such as a memory or a hard disk becomes widespread.

A digital camera whose lens can be interchanged is also commercially available like a camera which transfers image data onto a film. However, in the case of the digital camera whose lens can be interchanged, there is a problem that dirt or dust (which are collectively called "dirt", hereinafter) is adhered to the image sensor device, an image sensor device protecting glass fixed on the image sensor device, a surface of a filter and the like, or an optical system when the lens is interchanged. There is a problem that in the case of an image which was shot in a state where dirt is adhered, since light does not enter a picture element portion on which dirt is adhered, image failure is caused.

BRIEF SUMMARY OF THE INVENTION

It is an object of the present invention to provided a digital camera which can correct the degradation of image quality of a shot image even if dirt is adhered to an image sensor device, an image sensor device protecting glass fixed on the image sensor device or a filter when the lens is interchanged, and to provide a dirt position detecting method for a digital camera for detecting a position of dirt which causes image failure.

A digital camera of the present invention whose lens is detachable, comprises: a judging section for judging whether an image failure is caused due to dirt adhering on an image sensor device unit including image sensor device; an illuminating member which is disposed in the vicinity of the image sensor device unit such that irradiation light can enter the image sensor device and which is driven when at least the judgment is made; a memory for storing a position of a picture element of the image sensor device corresponding to image sensor data causing image failure when the judging section judged that image failure has been caused; and a correcting section for correcting the image sensor data output from the image sensor device unit based on image position data stored in the memory when a picture is photographed after the lens is interchanged.

Preferable modes of this semiconductor device are as follows:
(a) The digital camera further comprises a liquid crystal display for displaying the image data output from the image sensor device unit, wherein the illuminating member also serves as a backlight which irradiates illumination light from a back side of the liquid crystal display.
(b) The correcting section corrects the image sensor data which correspond to picture element position data stored in the memory and which were output after the lens was interchanged, based on image sensor data corresponding to picture element position adjacent to the picture element position data.
(c) The digital camera further comprises a warning section for warning of a user of the fact that there exists a picture element which can not be corrected when the image sensor data could not be corrected by the correcting section. The warning section warns when the number of picture elements which are adjacent to the picture element position data stored in the memory and which continuously cause image failure is greater than the predetermined number. The warning section warns when the lens is interchanged or a power supply is turned on.
(d) The image sensor device unit comprises at least one of a protecting glass for protecting a surface of the image sensor device, and a filter.
(e) A picture element defect owned by the image sensor device itself is stored in the memory, and the correcting section corrects an image failure owned by the image sensor device itself.
(f) The correcting section corrects the image sensor data which correspond to picture element position data stored in the memory and which were output after the lens was interchanged, based on image sensor data corresponding to picture element position adjacent to the picture element position data.
(g) The digital camera further comprises a second memory for storing a picture element defect owned by the image sensor device itself, wherein the correcting section corrects an image failure caused by dirt when there is no defect picture element owned by the image sensor device itself.
(h) The correcting section corrects the image sensor data which correspond to picture element position data stored in the memory and which were output after the lens was interchanged, based on image sensor data corresponding to picture element position which is adjacent to a picture element position stored in the memory.

A digital camera of the present invention whose lens is detachable, comprises: a judging section for judging whether an image failure is caused due to dirt adhering on an image sensor device unit; an illuminating member which is disposed in the vicinity of the image sensor device unit such that irradiation light can enter the image sensor device and which is driven when at least the judgment is made; a dirt position detecting section for storing a position of a picture element of the image sensor device causing image failure when the judging section judged that image failure has been caused; a memory for storing a position of a picture element of the image sensor device corresponding to a dirt position detected by the dirt position detecting section; and a correcting section for correcting the image sensor data output from the image sensor device unit based on picture element position data stored in the memory when a picture is photographed after the lens is interchanged.

A dirt position detecting method of the present invention for a digital camera for judging whether dirt is adhering on an image sensor device unit including an image sensor element provided in a case of the digital camera whose lens is interchangeable, comprises the steps of: shielding light entering the case; irradiating light into the image sensor device disposed in the case; judging whether image failure is caused because dirt adheres by the irradiated light; and storing a position of a picture element causing image failure when it is judged that the image failure is caused.

A preferred mode of the digital camera is as follows.

In the step for irradiating light to the image sensor element, a backlight which irradiates illumination light, from a back side, to a liquid crystal display which displays image data output from the image sensor device, is driven, and the image sensor device is allowed to irradiate light.

With the above configuration, the present invention has operations and effects described below.

By irradiating LCD backlight to the CCD, by detecting picture element of the CCD corresponding to image data causing image failure due to dirt, and by removing picture element defect previously owned by the CCD stored in the camera from the detected picture element, it is possible to detect a position of the picture element having the image failure. If the data corresponding to the picture element position causing the image failure in a new image photographed after the lens is interchanged are corrected from surrounding image data in the picture element position, it is possible to suppress the deterioration of image quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the drawings.

Figure 1:
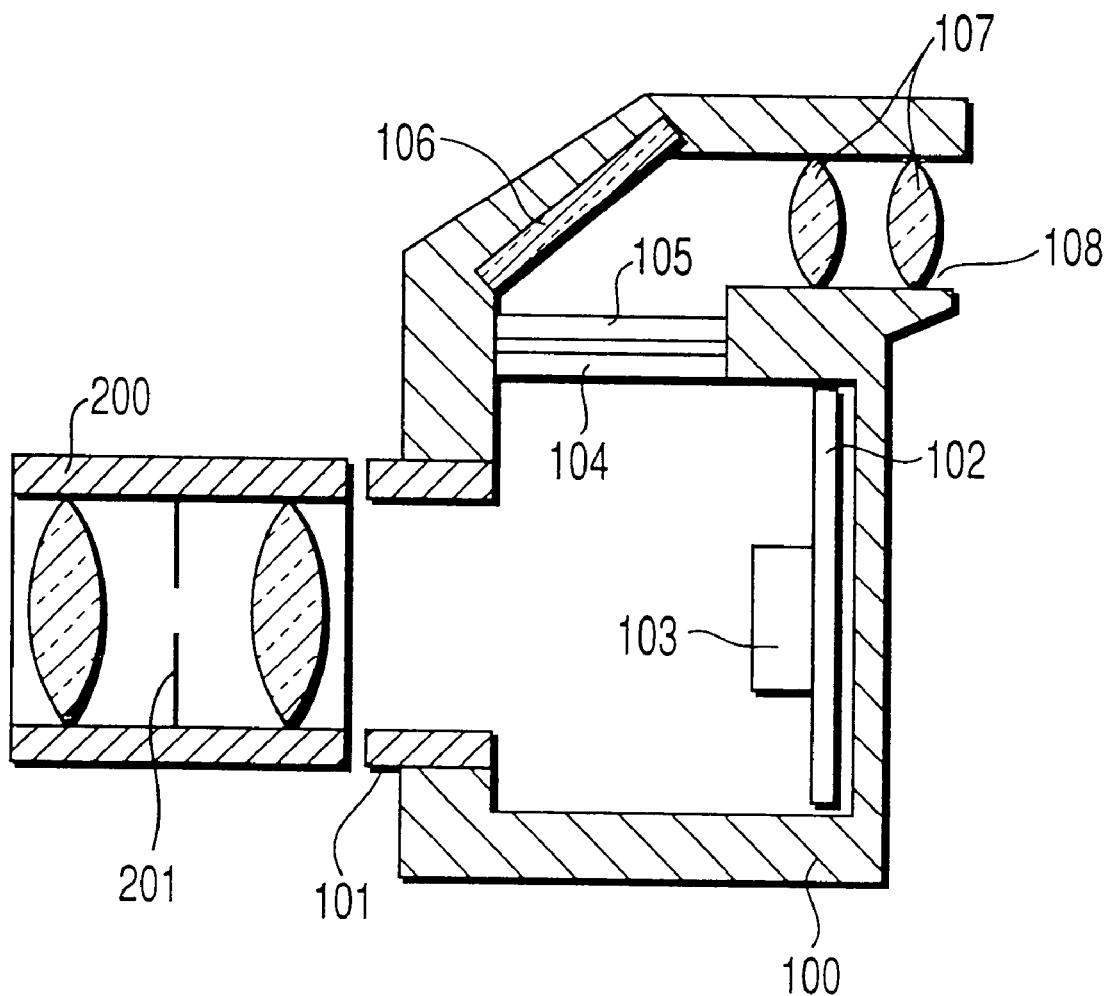
FIG. 1 is a sectional view showing a general structure of a digital camera according to one embodiment of the present invention.
Figure 2:
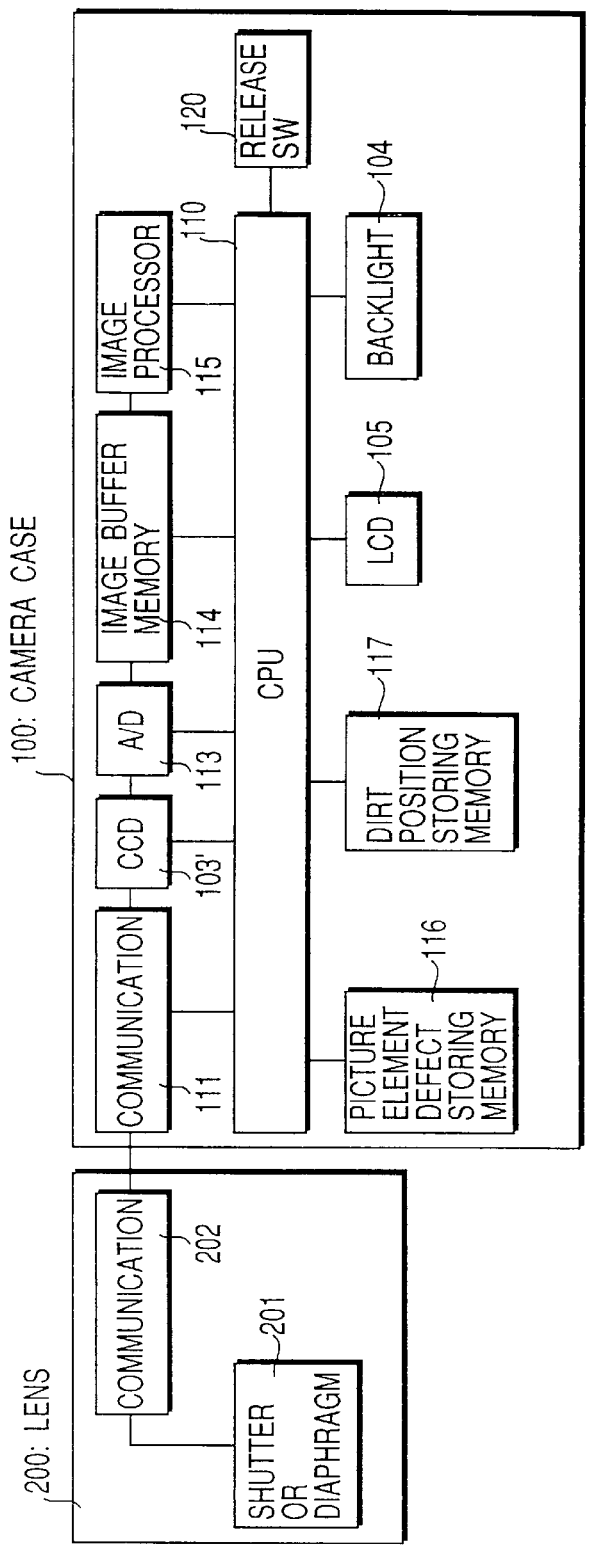
FIG. 2 is a block diagram showing a circuit structure of the digital camera according to the embodiment of the present invention.

FIG. 1 is a sectional view showing a general structure of a digital camera according to the embodiment of the present invention. FIG. 2 is a block diagram showing a circuit structure of the digital camera according to the embodiment.

A lens 200 mounted to a mount 101 provided in a camera case 100 is detachable. The lens 200 is provided with a shutter or diaphragm 201. An image entering the camera case 100 through the lens 200 is formed on a surface of a CCD 103' in a CCD unit 103 disposed on a PC board 102.

In addition to the CCD 103', a filter and a CCD protecting glass (not shown) are fixed to the CCD unit 103.

Image data formed on the CCD 103' are subjected to image processing and then displayed on an LCD 105. When a backlight 104 is lit, if a user peeps into a finder 108, he or she can see the image displayed on the LCD 105 through lenses 107 and a mirror 106.

Connected to a CPU 110 in the camera case 100 are the CCD 103', the backlight 104, the LCD 105, a communication 111, an A/D converter 113, an image buffer memory 114, an image processor 115 comprising a DSP, a picture element defect position storing memory 116 for storing a fact that there exists a defect in a predetermined picture element itself in the CCD, a dirt position storing memory 117 for storing a position of a picture element in the CCD 103' having an image failure due to dirt, and a release SW 120. It is preferable to use nonvolatile memories as the picture element defect position storing memory 116 and the dirt position storing memory 117. It is needless to say that the picture element defect position storing memory 116 and the dirt position storing memory 117 may use the same memory chip and only their addresses may be changed from each other.

Information concerning kind of the lens 200, an instruction signal from the CPU 110 and the like are transmitted by the communications 111 and 202 respectively provided in the camera case 100 and the lens 200.

Figure 3:
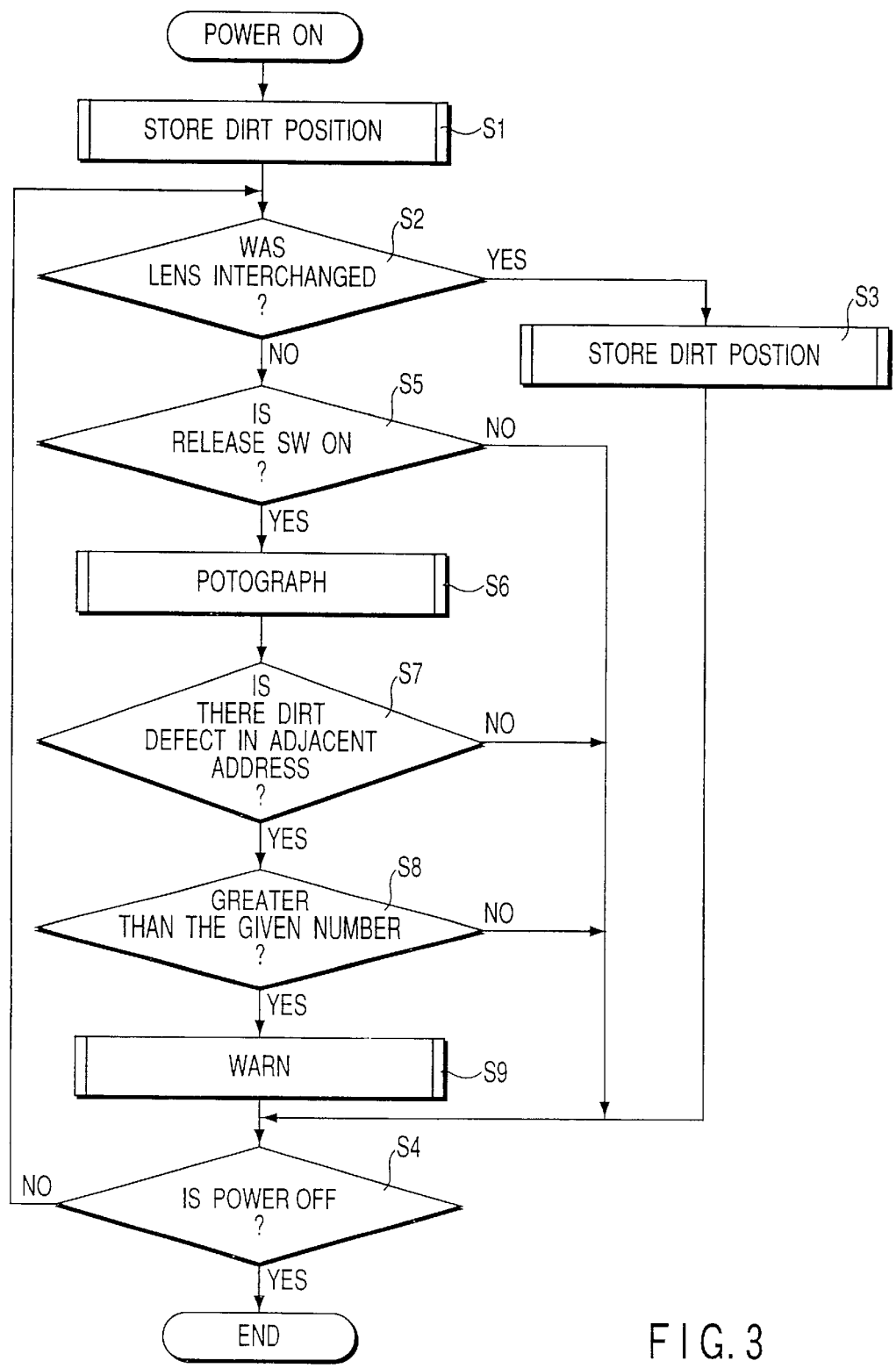
FIG. 3 is a flowchart for explaining the operation from the time when the power is turned on to the time when the power is turned off of the digital camera according to the embodiment of the present invention.

Next, the operation from the time when the power is turned on to the time when the power is turned off will be explained with reference to FIG. 3. In the following explanation of the operation, the CPU 110 controls various parts in accordance with a program. First, if a power supply switch is turned on, a picture element defect of the CCD 103' and a picture element of the CCD 103' corresponding to image data having image failure caused by dirt are detected, and an address of the picture element detected by removing a picture element defect existing from the beginning is stored in the dirt position storing memory 117 (step S1). A method for detecting a picture element having a problem in its image data caused by dirt will be explained later.

Next, it is judged whether the lens was interchanged by detecting that the lens 200 was attached or detached (step S2). When the lens 200 was attached or detached, a picture element corresponding to image data having an image failure caused by dirt is again detected as in step S1, and the address of the detected picture element of the CCD 103' is stored in the dirt position storing memory 117 (step S3). Then, it is judged whether the power supply switch is turned off (step S4). If the power supply switch was turned off, the procedure is completed here. If the power supply switch was not turned off, the flow proceeds back to step S2.

When it is judged that the lens was not interchanged in step S2, a state of the release SW 120 is detected to judge whether the release SW 120 was turned on (step S5). When the release SW 120 was not turned ON, it is judged the power supply switch was turned off (step S4).

When the release SW 120 was turned on, an image entering the CCD 103' is photographed (step S6). Then, the addresses of the picture element defect and image failure picture element stored in the picture element defect position storing memory 116 and the dirt position storing memory 117 are read out, and it is judged whether a picture element adjacent to the picture element stored in the picture element defect position storing memory 116 and the dirt position storing memory 117 has failure (step S7). When the adjacent picture element has no failure, it is judged whether the power supply switch was turned off (step S4).

When the adjacent picture element has a failure, it is judged whether the number of picture elements continuously causing failure is greater than the given number (step S8). If the number is not greater than the given number, it is judged whether the power supply switch was turned off (step S4). If the number is greater than the given number, the user is warned and advised to remove the dirt adhering to the CCD 103' (step S9). As the warning, the user is warned by beep tones using a PCV and the like, or by warning display for displaying the position of the dirt on the LCD 105 using highlight.

Figure 4:
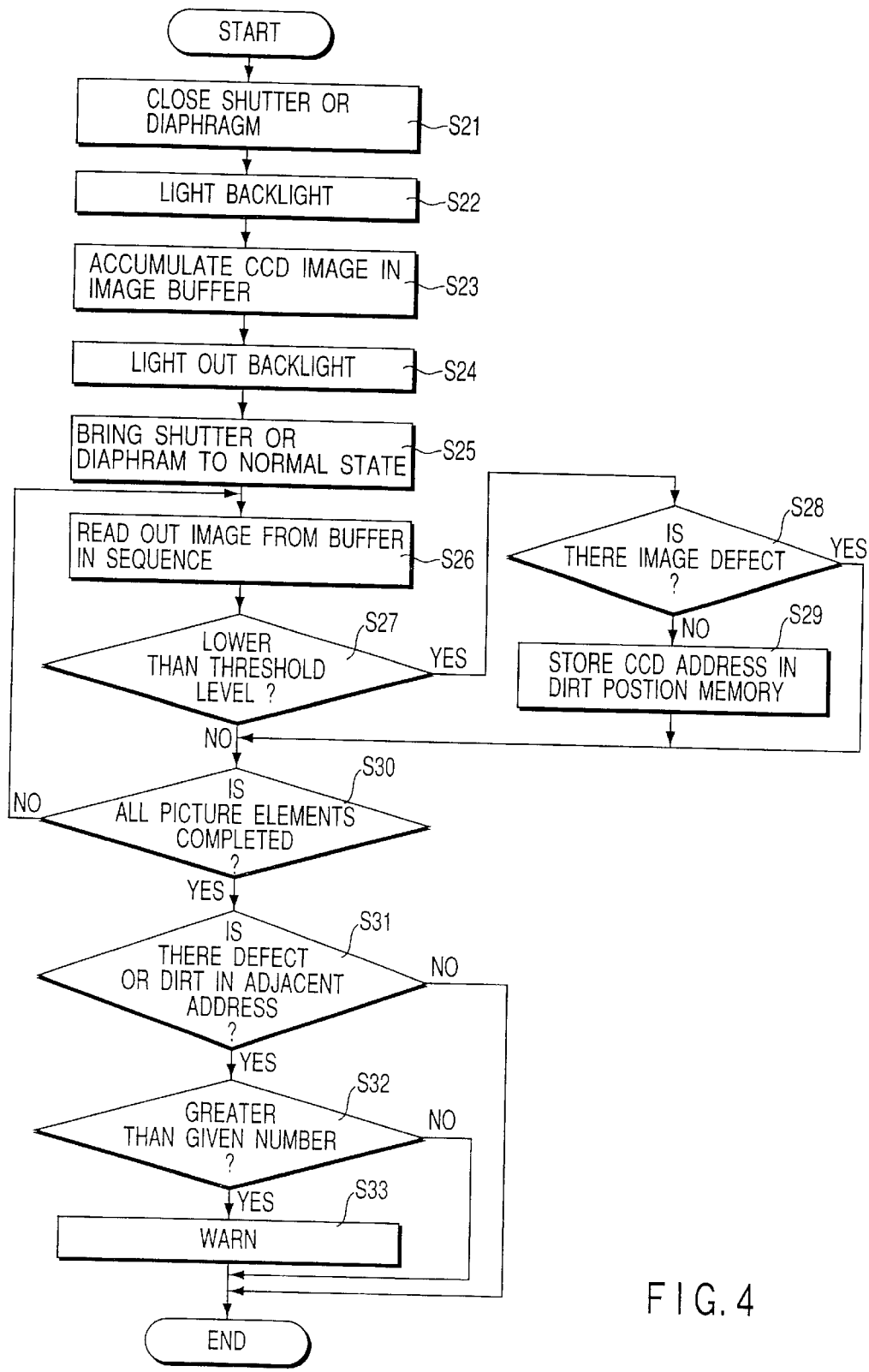
FIG. 4 is a flowchart for explaining the dirt position detecting operation of the digital camera according to the embodiment of the present invention.

Next, a method for detecting a position of a picture element having failure caused by dirt will be explained. FIG. 4 is a flowchart showing the dirt position detecting method according to the embodiment of the present invention.

First, the shutter or the diaphragm 201 is completely closed so that no light except from the backlight 104 does not enter the CCD 103' (step S21). Instead of closing the shutter or the diaphragm 201, a lens cap may be put on. Next, the backlight 104 is allowed to light (step S22). The order of the steps S21 and S22 may be reversed.

Next, the image data are read out by the CCD 103', the detected image data are converted into digital data by the A/D converter 113, and the converted digital data are stored in the image buffer memory 114 (step S23).

Next, the backlight 104 is allowed to light out (step S24). The shutter or the diaphragm 201 is opened, thereby bringing back the camera into its normal state (step S25). The order of the steps S24 and S25 may be reversed.

Then, image data respectively corresponding to positions of picture elements stored in the image buffer memory 114 are called up in sequence (step S26). The called-up image data value is compared with a preset threshold level (step S27). If dirt is adhered to the CCD, the amount of light entering a picture element in the corresponding position is reduced. Therefore, if the obtained data are compared with the set threshold level, it is possible to detect a picture element having image failure. If outside light enters the camera body when the failure is detected, the obtained data may become higher than the threshold level in some cases even though the failure has been caused. Therefore, the outside light must be shut off.

When the image data value is lower than the threshold level, the value is compared with a position of picture element defect which is previously factory-stored in a picture element defect position storing memory, thereby judging whether there is a picture element defect (step S28). Only when it is judged that the defect is not caused by the picture element defect, the position of the corresponding picture element is stored in the dirt position storing memory (step S29). Thereafter, it is confirmed whether all the picture elements are read out (step S30).

In step S30, if it is judged that the reading-out operation of all the picture elements is not completed, the flow proceeds back to step S26, where image data in the next picture element are read out.

Then, if the detection of all the picture elements is completed and a picture element photographing the image failure due to dirt is detected in step S30, it is checked whether there exists image failure in a picture element adjacent to the detected picture element position due to picture element defect or dirt (step S31). If the adjacent picture element has defect or failure, it is judged whether the number of picture elements continuously causing image failure is greater than the constant number (step S32). If the number is not greater than the constant number, it is judged whether the power supply switch was turned off (step S4). If the number of the continuous picture elements is greater than the constant number, the user is warned and advised to remove the dirt adhering to the CCD 103' (step S33). As the warning, the user is warned by beep tones using a PCV and the like, or by warning display for displaying the position of the dirt on the LCD 105 using highlight. By warning the user here, if the picture element defect could not be corrected, it is possible to advise the user to remove the dirt when the power is on or the lens is interchanged. Further, the user may be warned absolutely when the power is on or the lens is interchanged. If it is judged that the adjacent picture element has no defect or there is no dirt, the flow is completed.

Figure 5:
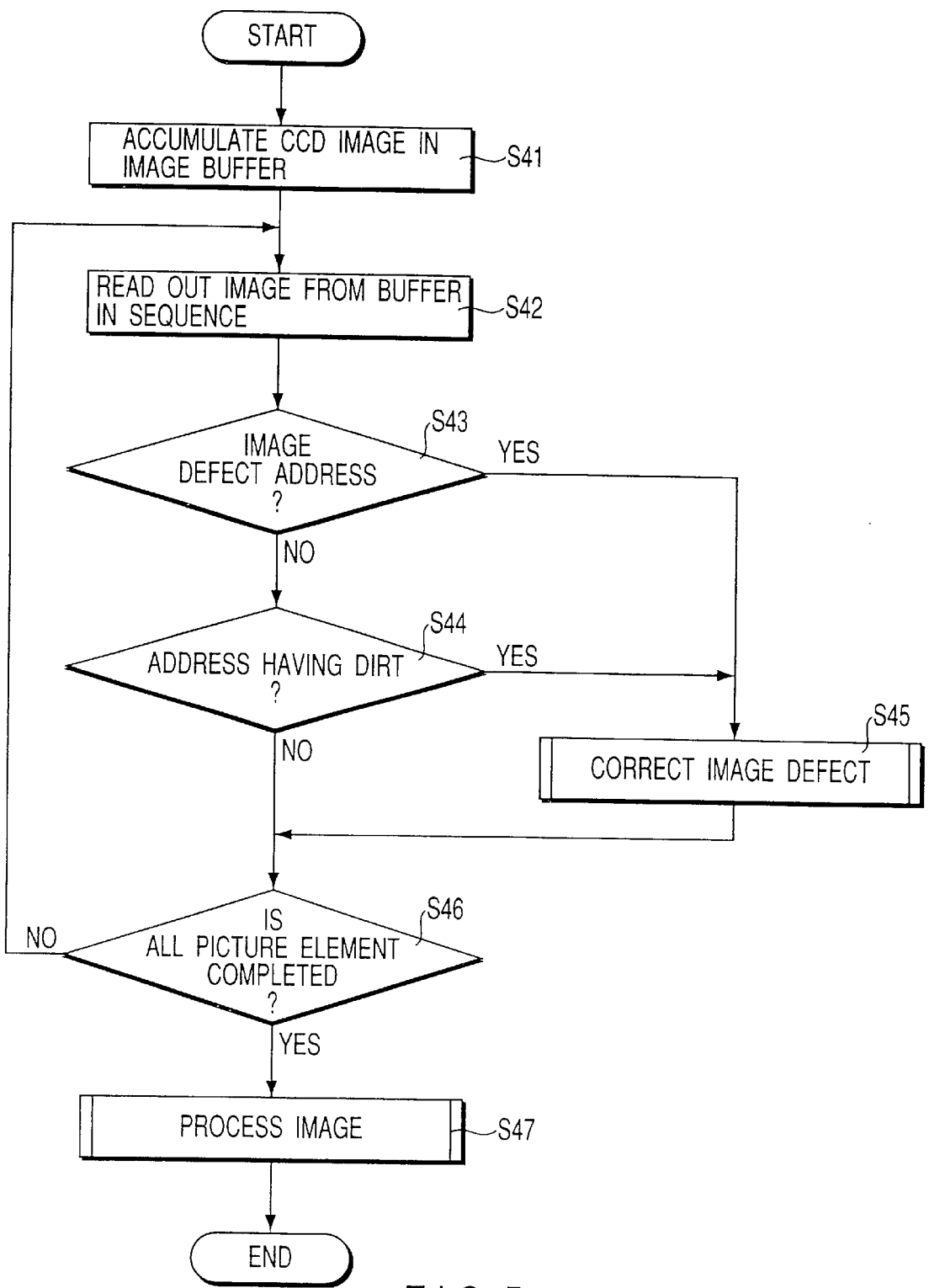
FIG. 5 is a flowchart for explaining the shooting operation of the digital camera according to the embodiment of the present invention.

Next, the operation at the time of photographing (step S6) will be explained using a flowchart shown in FIG. 5. First, the image data obtained by the CCD 103' are converted into digital data by the A/D converter 113, and the converted data are stored in the image buffer memory 114 (step S41).

Then, the image data of the picture elements are read out in sequence from the image buffer memory 114 (step S42). Address of the read-out image data and address of picture element registered in the picture element defect position storing memory 116 are compared with each other, and it is checked whether the read-out image data have defect (step S43).

If the read-out image data did not have defect, address of the read-out image data and address of position of picture element registered in the dirt position storing memory 117 are compared with each other, and it is checked whether the read-out image data have defect caused by dirt (step S44).

In steps S43 and S44, if the address of the read-out image data corresponds to address of the picture element defect or address of picture element having dirt, the image data are corrected using surrounding normal image data (step S45). If there is no defect in eight picture elements adjacent to the read-out image data, the image data can be corrected excellently.

Thereafter, it is checked whether all the picture elements have been read out (step S46), and if all the picture elements have not yet been read out, the flow again proceeds back to step S42, where the next picture element is read out. When it is judged that all the picture elements have been read out, this means that all the image data corresponding to one sheet have been corrected and thus, the image data are subjected to image processing such as compression (step S47), and the photographing is completed.

According to the digital camera of the present embodiment, picture elements causing image failure is detected by irradiating the CCD with light from the LCD backlight, and the picture element having the defect is removed from the detected picture elements so that the picture element causing the image failure due to dirt can be detected. Further, by correcting image data causing image failure from image data located in the vicinity, it is possible suppress deterioration of the image quality without using special illuminating members or the like.

Furthermore, when the failure could not be corrected, it is possible to advise the user to remove the dirt by warning the user of the fact that the failure could not be corrected.

The present invention should not be limited to the above embodiment, and it is possible to variously deform and carry out the present invention without departing the subject of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera whose lens is detachable, comprising:
   a judging section for judging whether an image failure is caused due to dirt adhering to an image sensor device unit including an image sensor device;
   an illuminating member which is disposed in a vicinity of the image sensor device unit such that irradiation light can enter the image sensor device and which is driven at least when the judgment is made;
   a memory for storing a position of a picture element of the image sensor device corresponding to image sensor data causing image failure when the judging section judges that image failure has been caused;
   a correcting section for correcting the image sensor data output from the image sensor device unit based on image position data stored in the memory when a picture is photographed after the lens is interchanged; and
   a liquid crystal display for displaying the image data output from the image sensor device unit,
   wherein the illuminating member also serves as a backlight which irradiates illumination light from a back side of the liquid crystal display.

2. The digital camera according to claim 1, wherein the correcting section corrects the image sensor data which correspond to picture element position data stored in the memory and which were output after the lens was interchanged, based on image sensor data corresponding to a picture element position adjacent to the picture element position data.

3. The digital camera according to claim 1, wherein the image sensor device unit comprises at least one of a protecting glass for protecting a surface of the image sensor device, and a filter.

4. The digital camera according to claim 1, wherein the memory stores a picture element defect caused by the image sensor device, and the correcting section corrects an image failure caused by dirt when there is no picture element defect caused by the image sensor device.

5. The digital camera according to claim 4, wherein the correcting section corrects the image sensor data which correspond to picture element position data stored in the memory and which were output after the lens was interchanged, based on image sensor data corresponding to a picture element position adjacent to the picture element position data.

6. The digital camera according to claim 1, wherein the memory stores a picture element defect caused by the image sensor device, and the correcting section corrects an image failure caused by the image sensor device.

7. The digital camera according to claim 1, further comprising a second memory for storing a picture element defect caused by the image sensor device,
   wherein the correcting section corrects an image failure caused by dirt when there is no picture element defect caused by the image sensor device.

8. The digital camera according to claim 1, wherein the correcting section corrects the image sensor data which correspond to picture element position data stored in the memory and which were output after the lens was interchanged, based on image sensor data corresponding to a picture element position which is adjacent to a picture element position stored in the memory.

9. A digital camera whose lens is detachable, comprising:
   a judging section for judging whether an image failure is caused due to dirt adhering to an image sensor device unit including an image sensor device;
   an illuminating member which is disposed in a vicinity of the image sensor device unit such that irradiation light can enter the image sensor device and which is driven at least when the judgment is made;
   a memory for storing a position of a picture element of the image sensor device corresponding to image sensor data causing image failure when the judging section judges that image failure has been caused;
   a correcting section for correcting the image sensor data output from the image sensor device unit based on image position data stored in the memory when a picture is photographed after the lens is interchanged; and
   a warning section for warning a user that a picture element which can not be corrected is present, when the image sensor data can not be corrected by the correcting section.

10. The digital camera according to claim 9, wherein the warning section warns the user when a number of picture elements which are adjacent to the picture element position data stored in the memory and which continuously cause image failure is greater than a predetermined number.

11. The digital camera according to claim 9, wherein the warning section warns the user when at least one of (i) the lens is interchanged and (ii) a power supply is turned on.

12. A dirt position detecting method for a digital camera for judging whether dirt is adhering to an image sensor device unit including an image sensor element provided in a case of the digital camera, whose lens is interchangeable, said method comprising:
    shielding light entering the case;
    irradiating light onto the image sensor device disposed in the case;
    judging whether image failure is caused due to dirt by the irradiated light; and
    storing a position of a picture element causing image failure when it is judged that the image failure is caused.

13. The dirt position detecting method according to claim 12, wherein light is irradiated onto the image sensor element by driving a backlight which irradiates illumination light, from a back side, to a liquid crystal display which displays image data output from the image sensor device.

14. A digital camera whose lens is detachable, comprising:
    an image sensor device unit including an image sensor device having a plurality of picture elements;
    a memory for storing a position of a picture element having an image failure in the image sensor device;
    an illuminating member disposed in a vicinity of the image sensor device unit to enable irradiation light to enter the image sensor device;
    a judging section for judging whether the lens is interchanged;
    a driving section for closing a shutter to prevent outside light from entering the image sensor device unit, and for driving the illuminating member, after the judging section judges that the lens is interchanged;
    a detecting unit for detecting whether a picture element has an image failure, when the illuminating member is driven;

a determination unit for removing a position of the picture element having the image failure in the image sensor device, from a position of the picture element having the image failure which is detected by the detecting unit, to thereby determine a position of a picture element having an image failure caused by dirt adhering to the image sensor device unit;

a storing unit for storing the position of the picture element having an image failure caused by dirt adhering to the image sensor device unit in the memory; and a correcting section for correcting image sensor data output from the image sensor device unit based on the position of the picture element which is stored in the memory, when photographing is performed after the lens is interchanged.

15. The digital camera according to claim 14, further comprising a liquid crystal display for displaying the image data output from the image sensor device unit, and wherein the illuminating member comprises a backlight which irradiates illumination light from a back side of the liquid crystal display.

16. The digital camera according to claim 14, wherein the correcting section corrects image sensor data which correspond to picture element position data stored in the memory, and which were output after the lens was interchanged, based on image sensor data corresponding to a picture element position adjacent to a picture element position indicated by the picture element position data.

17. The digital camera according to claim 14, further comprising a warning section for warning a user that, a picture element which can not be corrected is present, when the image sensor data can not be corrected by the correcting section.

18. The digital camera according to claim 17, wherein the warning section warns the user when a number of picture elements, which are adjacent to the picture element position indicated by the picture element position data stored in the memory, and which continuously cause image failure, is greater than a predetermined number.

19. The digital camera according to claim 17, wherein the warning section warns the user when at least one of (i) the lens is interchanged and (ii) a power supply is turned on.

20. The digital camera according to claim 14, wherein the image sensor device unit comprises at least one of a filter and a protecting glass for protecting a surface of the image sensor device.

21. A digital camera according to claim 14, wherein the correcting section corrects an image failure in the image sensor device.

22. A dirt position detecting method for a digital camera for judging whether dirt adheres to an image sensor device unit including an image sensor element provided in a case of the digital camera, whose lens is interchangeable, said method comprising:

judging whether the lens is interchanged, closing a shutter to prevent outside light from entering the image sensor device unit, after the lens is interchanged, and then irradiating light onto the image sensor device disposed in the case;

judging whether an image failure is caused in the image sensor device unit, while irradiating the light;

specifying a position of a picture element in which the image failure is caused by the dirt adhering onto the image sensor device unit, based on defect image position data stored in advance in the image sensor device;

storing in a memory image position data of the picture element in which the image failure is caused by the dirt adhering onto the image sensor device unit; and correcting the image sensor data output from the image sensor device based on the image position data stored in the memory, when photographing is performed after the lens is interchanged.

* * * * *